United States Patent
Lindtner

(10) Patent No.: US 8,814,191 B2
(45) Date of Patent: Aug. 26, 2014

(54) LEAF SPRING HAVING A RIGIDLY CONNECTED ELASTIC CONNECTING BODY FOR A MOTOR VEHICLE

(71) Applicant: MAGNA STEYR Fahrzeugtechnik AG & Co. KG, Graz (AT)

(72) Inventor: Werner Lindtner, Graz (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 0 days.

(21) Appl. No.: 13/714,520

(22) Filed: Dec. 14, 2012

(65) Prior Publication Data

US 2013/0154227 A1 Jun. 20, 2013

(30) Foreign Application Priority Data

Dec. 14, 2011 (EP) ...................................... 11193523

(51) Int. Cl.
*B60G 11/46* (2006.01)

(52) U.S. Cl.
USPC ...... 280/124.163; 280/124.164; 280/124.165; 280/124.169

(58) Field of Classification Search
USPC ................... 280/124.163, 124.164, 124.165, 280/124.169, 124.17
See application file for complete search history.

(56) References Cited

U.S. PATENT DOCUMENTS

| | | | | |
|---|---|---|---|---|
| 1,400,563 A | * | 12/1921 | Masury et al. | 267/30 |
| 2,973,951 A | | 3/1961 | Billing | |
| 3,250,546 A | * | 5/1966 | Allison | 280/124.176 |
| 3,924,873 A | * | 12/1975 | Crouch | 280/124.176 |
| 4,750,718 A | * | 6/1988 | Nickel | 267/49 |
| 4,895,350 A | * | 1/1990 | Schoof et al. | 267/52 |
| 7,651,107 B1 | * | 1/2010 | Chapin et al. | 280/124.165 |
| 2011/0140388 A1 | * | 6/2011 | Juriga | 280/124.163 |
| 2012/0161411 A1 | * | 6/2012 | Ehrlich et al. | 280/124.17 |

* cited by examiner

*Primary Examiner* — Toan To
(74) *Attorney, Agent, or Firm* — Jordan IP Law, LLC; Todd A Vaughn

(57) ABSTRACT

A motor vehicle arrangement, a motor vehicle and a connecting body for a motor vehicle. A leaf spring is configured to provide suspension of the motor vehicle, and an elastic connecting body is connected to the leaf spring, the elastic connecting body including a device configured to provide a rigid connection to a frame of the motor vehicle, a first elastic connecting body section and a second elastic connecting body section which are inclined with respect to one another and at least partially spaced apart from one another.

19 Claims, 4 Drawing Sheets

LEAF SPRING HAVING A RIGIDLY CONNECTED ELASTIC CONNECTING BODY FOR A MOTOR VEHICLE

CROSS-REFERENCE TO RELATED APPLICATIONS

The present application claims priority under 35 U.S.C. §119 to European Patent Application No. 11193523.5 (filed on Dec. 14, 2011), which is hereby incorporated by reference in its entirety.

FIELD OF THE INVENTION

Embodiments of the invention relate to an arrangement including a leaf spring for a motor vehicle and an elastic connecting body which is rigidly connected thereto and which includes a device configured to permit a rigid connection to a vehicle frame.

Embodiments of the invention further relate to a motor vehicle having a frame and a leaf spring configured to provide suspension of a wheel of the motor vehicle.

Embodiments of the invention also relate to an elastic connecting body including a device configured for a rigid connection to a leaf spring of a motor vehicle, a device configured for a rigid connection to a vehicle frame thereof, and sections which are inclined with respect to one another and at least partially spaced apart from one another.

BACKGROUND OF THE INVENTION

Generally, elastic connecting bodies having a pair of sections which are inclined with respect to one another and spaced apart from one another are known as machine bearings for bearing machines which are mounted in a stationary fashion. An arrangement of generally one elastic connecting body between a leaf spring and a frame of a motor vehicle is also known in principle. The elastic connecting body serves in known motor vehicles for transmitting the vertical component of the wheel forces acting on the leaf spring to the vehicle frame.

Furthermore, the connecting body has a damping and noise-reducing function since as a result the direct contact between the leaf spring and the frame is also avoided. In particular, in the case of dynamic loading, which acts on the vehicle, the vehicle therefore behaves quieter overall. In addition, the connecting body permits a sliding relative movement, specifically a rotation and/or displacement, between the leaf spring and the frame, which occurs during bending of the leaf spring. Examples of such an arrangement are disclosed in DE 937 391 C, DE 35 41 919 A1, DE 10 2009/028893 A1 and JP 04059406 A.

A disadvantage of the known systems is, inter alia, the sliding and therefore, abrasive relative movement between the leaf spring, connecting body and the frame. This undesirable movement results in a reduction in the overall service life of such an arrangement.

DE 496 607 also discloses an arrangement having a leaf spring and elastic connecting bodies, in which arrangement the connecting bodies are securely connected to the leaf spring and to the vehicle frame. There is no additional details in DE 496 607, however, regarding how a relative movement is to be specifically made possible between the leaf spring and the frame. Moreover, a disadvantage in the design is that a horizontal change in length between a plurality of connecting bodies, such as occurs during the spring action of the leaf spring, cannot be compensated due to the positional securement of the connecting bodies. Another disadvantage is that the relative rotation with respect to the frame, which occurs during the spring action of the leaf spring, cannot be compensated either since the comparatively flat connecting bodies are loaded compressively during such a movement and are therefore correspondingly rigid. Overall, the arrangement of a relative movement between the leaf spring and the frame which is disclosed in DE 496 607 therefore provides considerable resistance.

SUMMARY OF THE INVENTION

Provided in accordance with embodiments is an enhanced arrangement including a leaf spring and an elastic connecting body which is configured for rigid connection to the leaf spring.

Further provided in accordance with embodiments is an enhanced motor vehicle having a frame and a leaf spring for providing suspension for a wheel of the motor vehicle.

Also provided in accordance with embodiments is an enhanced elastic connecting body configured for arrangement between a leaf spring and a frame of a motor vehicle. In particular, while the elastic connecting body is configured got rigid connection to the frame and also rigid connection to the leaf spring, it is nevertheless is configured to permit a rotational movement between the connection of the elastic connecting body to the frame and the connection of the elastic connecting body to the leaf spring, as occurs during the spring action of the leaf spring, or to oppose said rotational movement with only little resistance.

In accordance with embodiments, a connecting body for a motor vehicle includes at least one of the following: a first device configured to permit a rigid connection of the connecting body to a leaf spring of the motor vehicle; a second device configured to permit a rigid connection of the connecting body to a frame of the motor vehicle; a first connecting body section; and a second connecting body section, whereby the first connecting body section and the second connecting body section are inclined with respect to one another and at least partially spaced apart from one another In accordance with embodiments, an arrangement includes a leaf spring for a motor vehicle and an elastic connecting body which is rigidly connected thereto and which includes a device configured to permit a rigid connection to a vehicle frame, whereby the elastic connecting body has sections which are inclined with respect to one another and at least partially spaced apart from one another.

In accordance with embodiments, a motor vehicle arrangement includes at least one of the following: a leaf spring configured to provide suspension of the motor vehicle; and an elastic connecting body which is connected to the leaf spring, the elastic connecting body including a device configured to provide a rigid connection to a frame of the motor vehicle, a first elastic connecting body section and a second elastic connecting body section which are inclined with respect to one another and at least partially spaced apart from one another.

In accordance with embodiments, a motor vehicle arrangement includes at least one of the following: a leaf spring configured to provide suspension of the motor vehicle; a first elastic connecting body which is connected to a first surface of the leaf spring, the first elastic connecting body including a first device configured to provide a rigid connection to a frame of the motor vehicle, a first elastic connecting body section and a second elastic connecting body section which are inclined with respect to one another and at least partially spaced apart from one another; and a second elastic connecting body which is connected to a second surface of the leaf spring which is opposite to the first surface, the second elastic connecting body including a second device configured to provide a rigid connection to a frame of the motor vehicle, a third elastic connecting body section and a fourth elastic connecting body section which are inclined with respect to one another and at least partially spaced apart from one another, whereby the first elastic connecting body and the second elastic connecting body are spatially arranged opposite to each other with respect to a neutral axis of the leaf spring.

In accordance with embodiments, a motor vehicle includes a frame and a leaf spring configured to provide a suspension for a wheel of the motor vehicle, whereby the leaf spring is a component of an arrangement of the type mentioned hereinabove, the at least one elastic connecting body of which is configured for rigid connection to the vehicle frame.

In accordance with embodiments, a motor vehicle includes at least one of the following: a frame; an arrangement configured for connection to the motor vehicle, the arrangement including (i.) a leaf spring configured to provide suspension of the motor vehicle; and (ii.) an elastic connecting body which is connected to a surface of the leaf spring at a first surface thereof and to the frame at a second end thereof, the elastic connecting body including a device configured to provide a rigid connection to the frame, a first elastic connecting body section and a second elastic connecting body section which are inclined with respect to one another and at least partially spaced apart from one another.

In accordance with embodiments, it is advantageous if the inclined sections are formed by the two limbs of a body having a Y geometric shaped, configuration and/or cross-section. Because the two inclined sections are arranged on a Y-shaped body, the elastic connecting body has only a few parts or in one particular embodiment is only composed of the Y-shaped body. The mounting of the elastic connecting body between the frame and the leaf spring of a vehicle is therefore conceivably simple.

Provided in accordance with embodiments is an elastic connecting body of the type disclosed herein, in which connecting body the inclined sections are formed by the two limbs of a Y-shaped body.

As a result of the particular configuration of the connecting body, it is relatively rigid with respect to linear compression or extension in all three axes, while rotation of the connection to the leaf spring with respect to the connection to the frame is relatively easily possible. This is the case, inter alia, because the connecting body is predominantly loaded in a shearing fashion during the specified rotation. In this way, the elastic connecting body can be rigidly connected to the frame and rigidly connected to the leaf spring while also permitting a rotational movement between the connection of the elastic connecting body to the frame and the connection of the elastic connecting body to the leaf spring, as occurs during the spring action of the leaf spring, or opposes said rotational movement with only little resistance.

If the specified sections are inclined only slightly with respect to a longitudinal axis of the leaf spring, a high degree of rigidity results in the direction of the longitudinal axis of the leaf spring and a low degree results transversely with respect thereto. If the sections are greatly inclined with respect to a longitudinal axis of the leaf spring, the situation is precisely reversed.

A further advantage of the spring arrangement is that the relative movement between the leaf spring and the frame is made possible by inner deformation of the elastic connecting body. A sliding and therefore abrasive relative movement between the leaf spring, connecting body and frame does not occur here, which favours a long service life of the disclosed spring arrangement.

Further advantageous refinements and developments of the invention can be found in the dependent claims and in the description in combination with the figures.

It is also advantageous if the inclined sections are formed by two separate bodies with axes which are inclined with respect to one another because the specified separate bodies can be configured in a relatively simple fashion, and in one advantageous embodiment they are completely identical.

It is further advantageous if the separate bodies are arranged on sections of a plate-shaped carrier which are inclined with respect to the leaf spring. As a result, the leaf spring does not need to have a particular configuration but instead the inclination of the specified separate bodies is brought about by the plate-shaped carrier. The separate bodies can then, in particular, also have a rectangular cross section.

It is additionally advantageous if the Y-shaped body or the separate bodies are prismatic. As a result, they can be manufactured particularly easily, for example by cutting to length a corresponding material in the form of a rod. In this way, the Y-shaped body or the separate bodies can also be particularly easily adapted to leaf springs of different widths.

It is even further advantageous if the elastic connecting body is composed at least partially of rubber or an elastomer. As a result, the deformation properties such as the modulus of elasticity and the damping can be set within wide limits.

It is yet and still advantageous if the elastic connecting body is bonded to the leaf spring or vulcanized thereon and/or the means for a rigid connection to the vehicle frame are formed by a surface which is provided for bonding to the vehicle frame or vulcanizing onto the vehicle frame. In this way, the leaf spring can be particularly easily connected to the leaf spring and/or the vehicle frame since this does not require a complex design for attachment thereof.

Further still, it is advantageous if the elastic connecting body is screwed to the leaf spring and/or the device for a rigid connection to the vehicle frame is formed by a rigid plate which is rigidly connected to the inclined sections and is provided for a screwed connection to the vehicle frame. This favours the exchange of components which can become defective in the course of time. For example, a connecting body can easily be exchanged if it is detachably connected to the vehicle frame and to the leaf spring. Of course, it is also conceivable that the connecting body is detachably connected to the leaf spring/the vehicle frame and non-detachably connected to the vehicle frame/the leaf spring.

It is even further advantageous if the sections of the at least one elastic connecting body are inclined differently with respect to a neutral axis of the leaf spring. As a result, the elastic connecting body is relatively rigid in one longitudinal axis and one vertical axis of the leaf spring.

It is yet an still also advantageous if a pivot point, about which the connection of the at least one connecting body to the vehicle frame and the connection thereof to the leaf spring are rotated during the spring action of the leaf spring, is arranged spaced apart from a neutral axis of the leaf spring. It is particularly advantageous in this context if the pivot point is arranged on the side of the neutral axis of the leaf spring facing the at least one connecting body, in particular on the outer side of the curvature of the leaf spring. As a result, the horizontal change in length between the connections of a plurality of connecting bodies to the leaf spring can be entirely or at least partially compensated during the spring action thereof.

It is still and all advantageous if a pivot point, about which the connection of the at least one connecting body to the vehicle frame and the connection thereof to the leaf spring are rotated during the spring action of the leaf spring, is arranged on a neutral axis of the leaf spring. As a result, the rigidity of the arrangement comprising the leaf spring and the elastic connecting body can be increased without increasing the rigidity of the leaf spring. As a result of the arrangement of the pivot point on the neutral axis of the leaf spring, a horizontal change in length between the connections of a plurality of connecting bodies to the leaf spring is specifically counteracted during the spring action thereof. The arrangement is therefore more rigid overall.

Moreover, it is advantageous if the torsion spring constant of an elastic connecting body about an axis running through the pivot point and in a transverse direction with respect to the leaf spring is 5 Nm/°. As a result, a rotation of the connection to the leaf spring with respect to the connection to the frame, as occurs during the spring action of the leaf spring, is relatively easily possible. The elastic connecting body is therefore stressed only a little during the spring action of the leaf spring, which results in a long service life thereof.

The spring arrangement in accordance with embodiments preferably includes at least two elastic connecting bodies which are arranged opposite one another with respect to the neutral axis of the leaf spring. The resulting arrangement is not only relatively rigid but also failsafe because in the event of a fracture in the connecting body, the function thereof is partially assumed by the other connecting body.

The spring arrangement may advantageously include at least one elastic positional securing device which is arranged opposite the at least one elastic connecting body with respect to the neutral axis of the leaf spring. This prevents the leaf spring moving in an uncontrolled way if an elastic connecting body were to break. The leaf spring is held in position in this case.

It is yet further advantageous if the leaf spring is arranged transversely with respect to the longitudinal axis of the vehicle and is provided for the suspension of, in each case, at least one wheel at, in each case, one end of the leaf spring. In this way, the number of the components necessary for the construction of a vehicle can be reduced since a single leaf spring is provided for the suspension of two wheels. The assembly of the motor vehicle is therefore significantly simplified.

It is yet and still advantageous if the arrangement comprising the leaf spring and the elastic connecting bodies is structurally installed in the motor vehicle in such a way that it takes up forces acting in a longitudinal direction and/or transverse direction of the vehicle. It is particularly advantageous in this context if the spring constant of the elastic connecting bodies which are connected to the leaf spring is in total (i.e., of all the connecting bodies arranged between the frame and the leaf spring and involved in the transmission of force) 200 N/mm in a longitudinal direction of the vehicle and/or 3000 N/mm in a transverse direction of the vehicle and/or 1000 N/mm in a vertical direction.

As a result of the particular configuration of the connecting body, the connecting body is relatively rigid with respect to a linear compression or extension in all three axes, while a rotation of the connection to the leaf spring with respect to the connection to the frame is relatively easily possible. The leaf spring can in this way also perform the function of a lower or upper transverse controller or triangular controller, of a stabilizer or also of a lane controller when used on a rear axle.

The specified components can thereby be dispensed with, as a result of which the design of a vehicle becomes particularly simple.

The above refinements and developments of the invention can be combined in any desired way.

BRIEF DESCRIPTION OF THE DRAWINGS

The invention is now explained below as an example with reference to the drawings, in which.

DETAILED DESCRIPTION OF EMBODIMENTS

Figure 1:
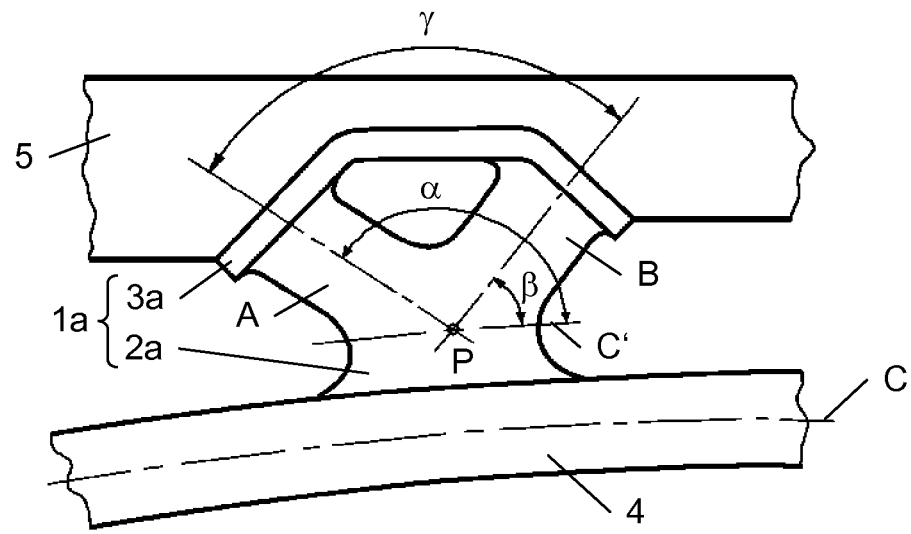
FIG. 1 illustrates an elastic connecting body between a leaf spring and a frame of a vehicle.

FIG. 1 shows an elastic connecting body 1a which is arranged between a leaf spring 4 of a motor vehicle and a vehicle frame 5 thereof. The elastic connecting body 1a includes sections such as first A and second section B, which are inclined with respect to one another and are formed in accordance with embodiments by the two limbs of a Y-shaped body 2a. The Y-shaped body 2a may be composed, for example, of an elastic material such as rubber or an elastomer.

The elastic connecting body 1a also includes a first device configured to provide a rigid connection to the leaf spring 4 and a second device configured to provide a rigid connection to the vehicle frame 5. Specifically, the first device for the rigid connection to the leaf spring 4 is/are formed by a surface which is provided for bonding to the leaf spring 4 or vulcanizing onto the leaf spring 4. The second device for the rigid connection to the vehicle frame 5 is/are formed by a rigid plate 3a which is rigidly connected to the inclined sections A, B and is provided for a mechanical connection, such as, for example, a screw connection, to the vehicle frame 5. Accordingly, one region or end of the elastic connecting body 1a is non-detachably connected to the leaf spring 4 and another region or end there is detachably connected to the vehicle frame 5. The rigid plate 3a may be composed, for example, of metal or of fibre-reinforced plastic.

It would, of course, also be conceivable for the elastic connecting body 1a to be detachably connected to the leaf spring 4, in particular, by a mechanical connection such as screw connection. The first device for the rigid connection to the leaf spring 4 is/are then formed by a rigid plate which is rigidly connected to the inclined sections A, B and is provided for a screwed connection to the leaf spring 4.

It would additionally be conceivable for the elastic connecting body 1a to be non-detachably connected to the vehicle frame 5, in particular to be bonded thereto. The second device for the rigid connection to the vehicle frame 5 is/are then formed by a surface which is provided for bonding to the vehicle frame 5. In accordance with embodiments, the rigid plate 3a can also be omitted. The Y-shaped body 2a can then be vulcanized directly onto the vehicle frame 5 or bonded thereto. The second device for the rigid connection to the vehicle frame 5 is/are then also formed by a surface which is provided for bonding to the vehicle frame 5 or vulcanizing onto the vehicle frame 5.

Figure 2:
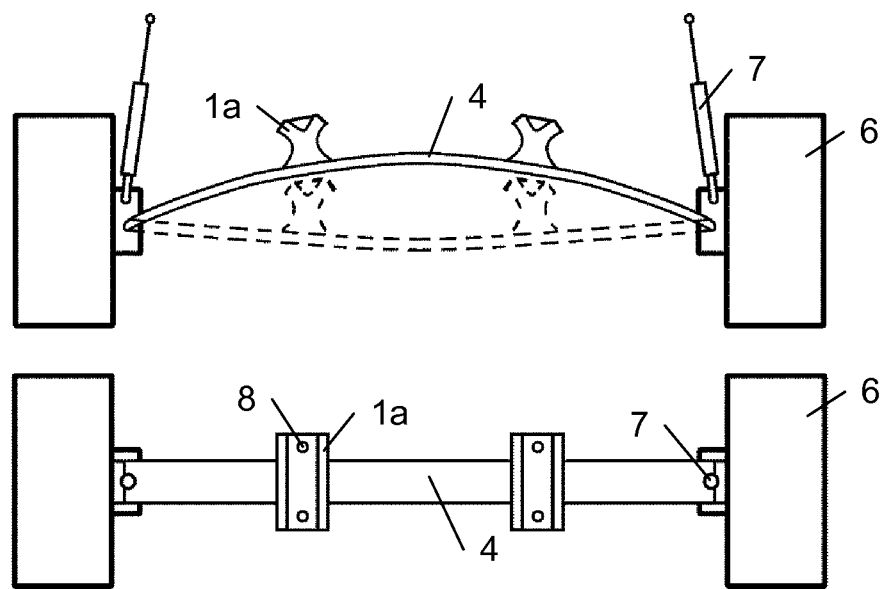
FIG. 2 illustrates an axle of a vehicle having an elastic connecting body and a leaf spring in a base outline and an elevation.

FIG. 2 illustrates a motor vehicle, specifically an axle thereof in a base outline and elevation. The arrangement including the leaf spring 4 and elastic connecting bodies 1a which are rigidly connected to the leaf spring 4 can be clearly seen therein. The frame 5 of the motor vehicle (see FIG. 1) to which the elastic connecting bodies 1a are connected is not shown for the sake of simpler illustration. The specified arrangement with the leaf spring 4 and the elastic connecting bodies 1a serves to provide suspension for two wheels 6 of the motor vehicle, which are each arranged at respective distal ends of the leaf spring 4. The leaf spring 4 is, for this purpose, arranged transversely with respect to the longitudinal axis of the vehicle. In addition, in FIG. 2 shock absorbers 7 are shown, which damp in a known fashion the vibrations occurring during the spring action.

The vehicle arrangement including the connecting bodies 1a and the leaf spring 4 is preferably installed structurally in the motor vehicle in such a way that it takes up forces acting in a longitudinal direction and/or transverse direction of the vehicle. For this purpose, in FIG. 2, attachment holes 8 are arranged in the plate 3a, with the aid of which attachment holes 8 the elastic connecting bodies 1a are attached to the vehicle frame 5. As a result, in accordance with embodiments, the leaf spring 4 can be secured positionally both in the longitudinal direction and the transverse direction of the vehicle. Alternatively, the leaf spring 4 can be displaced only slightly in the longitudinal direction and/or the transverse direction when loading occurs. The spring constant of the elastic connecting bodies 1a which are connected to the leaf spring 4 is preferably in total (i.e., both the connecting bodies 1a illustrated in FIG. 2) 200 N/mm in a longitudinal direction of the vehicle and/or 3000 N/mm in a transverse direction of the vehicle and/or 1000 N/mm in a vertical direction.

In FIG. 2 it is illustrated by dashed lines how approximately the leaf spring 4 and the elastic connecting bodies 1a are deformed during the spring action. As a result of the fact that the connecting bodies 1a are rigidly connected both to the leaf spring 4 and to the frame 5, the connection of the connecting body 1a to the vehicle frame 5 and the connection thereof to the leaf spring 4 are rotated with respect to one another about a point P during the spring action of the leaf spring 4, which point P can be seen in FIG. 1. As is clearly apparent there, the pivot point P is arranged spaced apart from a neutral axis C of the leaf spring 4. In specific terms, the pivot point P is located on the side of the neutral axis C of the leaf spring 4 facing the at least one connecting body 1a, here on the outside of the curvature of the leaf spring 4. As a result, the horizontal change in length between the connections of the connecting bodies 1a to the leaf spring 4 can be compensated entirely or at least partially.

Of course, it could also be possible to arrange the pivot point P on the inside of the curvature of the leaf spring 4. The torsion spring constant of the elastic connecting body 1a about an axis running through the pivot point P and in a transverse direction with respect to the leaf spring 4 is preferably 5 Nm/° in both cases.

In FIG. 1 it is also clearly apparent that the sections A, B of the elastic connecting body 1a are inclined differently with respect to the neutral axis C of the leaf spring 4. In specific terms, the section A is inclined by the angle α with respect to the neutral axis C, and the section B by the angle β. In order to illustrate better the angles α and β, the neutral axis C was displaced in parallel onto the axis C' in FIG. 1. It is also apparent in FIG. 1 that the sections A, B are inclined by the angle γ with respect to one another.

It is finally also conceivable that the movement region of the leaf spring 4 is limited by stops (not illustrated in FIG. 2) which can also be composed of rubber or an elastomer, but also of metal or fibre-reinforced plastic. These stops can limit the movement in the vertical direction and/or in the longitudinal direction and/or in the transverse direction.

Figure 3:
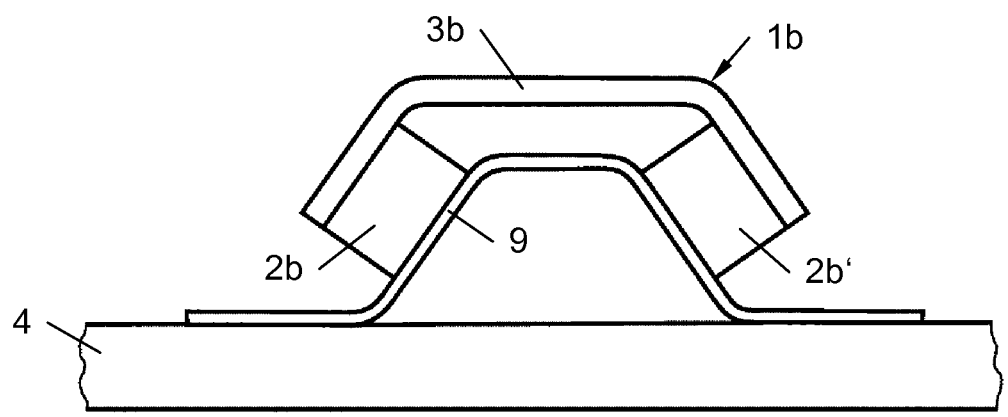
FIG. 3 illustrates an elastic connecting body having two separate bodies.

FIG. 3 illustrates a connecting body 1b in which the inclined sections A, B are formed by two separate bodies 2b, 2b' with axes which are inclined with respect to one another. In this example, the separate bodies 2b, 2b' are arranged on sections of a plate-shaped carrier 9 which are inclined with respect to the leaf spring 4, and said separate bodies 2b, 2b' have a rectangular cross-section and can be composed of an elastic material such as rubber or an elastomer. In addition, the separate bodies 2b, 2b' are also connected to a rigid plate 3b. The rigid plate 3b serves to attach the connecting body 1b to the frame 5, and the plate-shaped carrier 9 serves to attach the connecting body 1b to the leaf spring 4. The plate-shaped carrier 9 can be composed, for example, of metal or of fibre-reinforced plastic. In a way which is analogous to the arrangement illustrated in FIG. 1, it is also conceivable to eliminate the rigid plate 3b here. The two separate bodies 2b, 2b' are then connected directly to the vehicle frame 5.

The elastic connecting body 1b illustrated in FIG. 3 has, by virtue of the special design, a particularly high degree of rigidity in the longitudinal direction of the leaf spring 4 (running horizontally from left to right in FIG. 3). In the case of bending of the leaf spring 4, the plate-shaped carrier 9 is extended or compressed. The plate-shaped carrier 9 preferably performs only approximately 5% of the total extension/compression. On the other hand, the remaining 95% are performed by the bodies 2b, 2b'. The behaviour is similar in the case of rotation of the connection of the carrier 9 to the leaf spring 4 with respect to the connection of the plate 3b to the frame 5. The main part of the deformation of the elastic connecting body 1b, which occurs during the specific rotation, is also performed by the bodies 2b, 2b' here.

Figure 4:
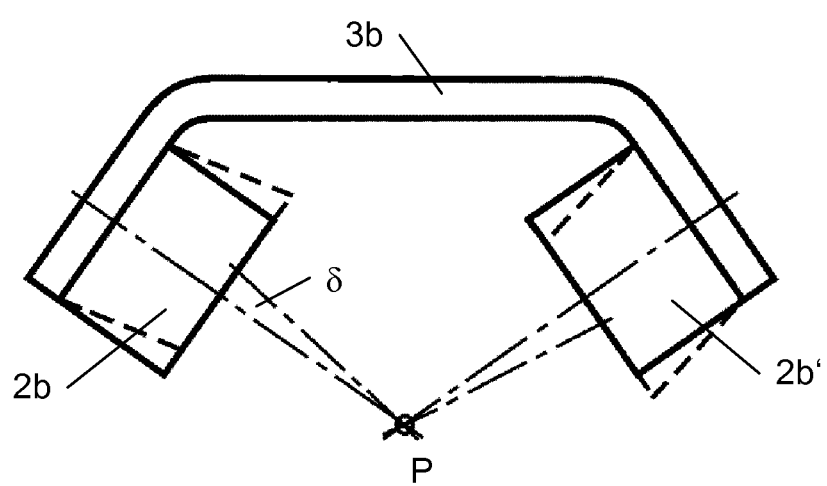
FIG. 4 illustrates a detail from FIG. 3 when the elastic connecting body is rotated.

FIG. 4 illustrates how the bodies 2b, 2b' behave when the plate 3b is rotated by the angle δ with respect to the carrier 9, as happens during the spring action of the leaf spring 4 (see in this respect also FIG. 2). In FIG. 4 it is clearly apparent that the bodies 2b, 2b' are distorted, as a result of which the plate 3b is rotated about the pivot point P with respect to the carrier 9.

Figure 5:
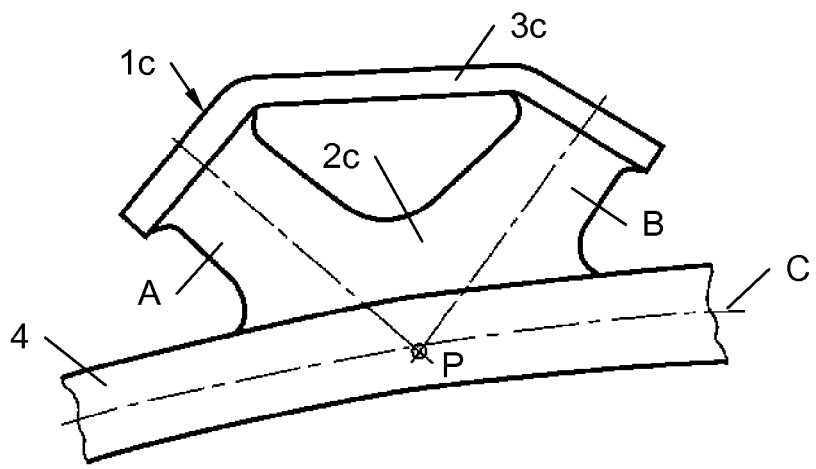
FIG. 5 illustrates an elastic connecting body having a pivot point on the neutral axis of the leaf spring.

FIG. 5 illustrates an elastic connecting body 1c which is structurally similar to the connecting body 1a illustrated in FIG. 1. However, a pivot point P, about which the connection of the connecting body 1c to the vehicle frame 5 and the connection thereof to the leaf spring 4 are rotated during the spring action of the leaf spring 4, is arranged on a neutral axis C of the leaf spring 4. As a result of the arrangement of the pivot point P on the neutral axis C of the leaf spring 4, a change in horizontal length between the connections of a plurality of connecting bodies 1c to the leaf spring 4 is counteracted during the spring action thereof. The arrangement is therefore more rigid overall.

Figure 6:
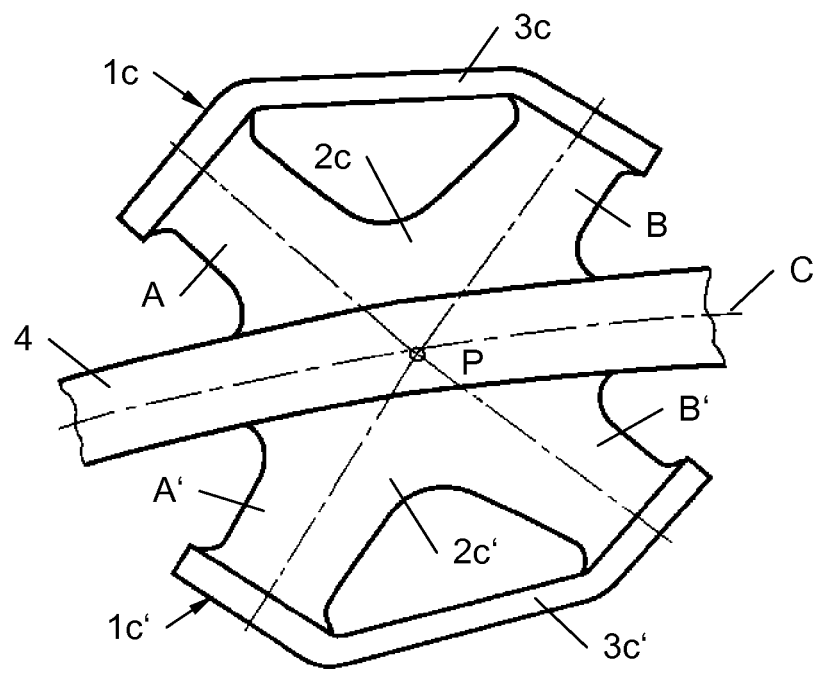
FIG. 6 illustrates an arrangement having elastic connecting bodies opposite one another.

FIG. 6 illustrates an arrangement similar in design to the arrangement illustrated in FIG. 5, but includes, however, elastic connecting bodies 1c, 1c' which are arranged opposite the leaf spring 4 with respect to the neutral axis C. The two connecting bodies 1c, 1c' can also be conceived of as a (divided) X-shaped/cross-sectioned connecting body. The resulting arrangement is both relatively rigid but also failsafe since in the event of a fracture of a connecting body 1c/1c', the function thereof is partially performed by the other connecting body 1c'/1c.

Figure 7:
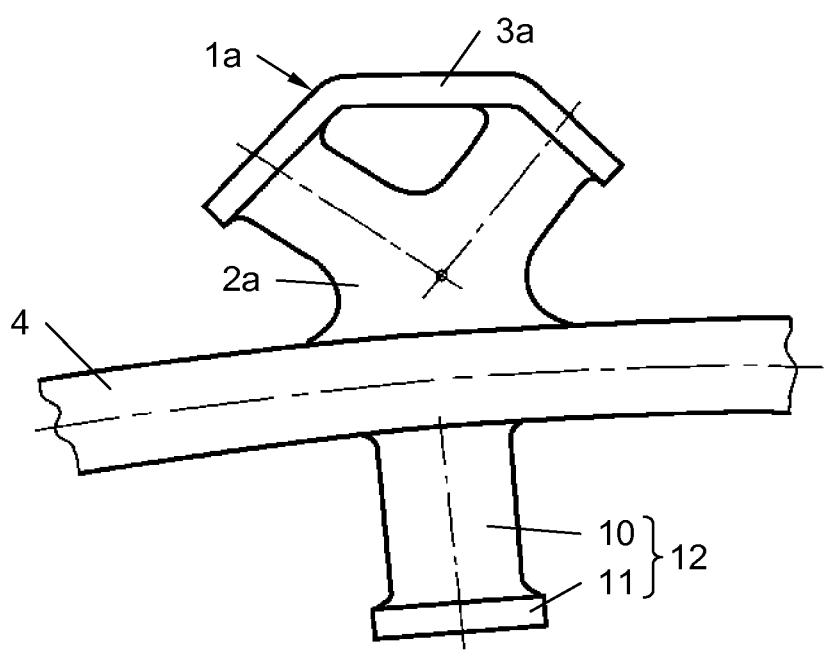
FIG. 7 illustrates a spring arrangement having a positional securing device.

FIG. 7 illustrates an arrangement similar in design to the arrangement illustrated in FIG. 1, but includes, however, a position securing device 12 which is arranged opposite a respective elastic connecting body 1a with respect to the neutral axis C of the leaf spring 4. The position securing mechanism 12 includes an elastic body 10 and a rigid plate 11 which is rigidly connected thereto. This prevents movement of the leaf spring 4 in an uncontrolled manner if the elastic connecting body 1a were to fracture. In such a circumstance, the leaf spring 4 is held in position by the position securing mechanism 12.

The elastic connecting bodies 1a, 1b, 1c which are illustrated in FIGS. 1 to 7 are preferably of prismatic design. The longitudinal axes of the prisms each run here in a perpendicular direction with respect to the plane of the drawing (applies to the elevation in FIG. 2). As a result, the elastic connecting bodies 1a . . . 1c can be produced, for example, by cutting to length a corresponding material in the form of a rod, and can therefore also be particularly easily adapted to leaf springs 4 of different widths.

In conclusion it is to be noted that the components of the figures are, under certain circumstances, not illustrated true to scale and that the individual variants which are illustrated in the figures can also form the subject matter of an independent invention. Position information such as "on the right", "on the left", "above", "below" and the like relate to the illustrated position of the respective component and should be correspondingly mentally adapted when the specified position is changed. Furthermore it is to be noted that the individual spring arrangements can also have more components than illustrated or even fewer components than illustrated without as a result departing from the basic idea of the present invention.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor vehicle arrangement comprising:
a leaf spring configured to provide suspension of the motor vehicle; and
an elastic connecting body which is connected to the leaf spring, the elastic connecting body comprising a device configured to provide a rigid connection to a frame of the motor vehicle, a first elastic connecting body section and a second elastic connecting body section which are inclined with respect to one another and at least partially spaced apart from one another,
wherein a pivot point, about which the connection of the elastic connecting body to the vehicle frame and the connection of the elastic connecting body to the leaf spring are rotated during spring action of leaf spring, is arranged spaced apart from a neutral axis of the leaf spring.

2. The motor vehicle arrangement of claim 1, wherein:
the first elastic connecting body section is inclined at a first angle with respect to a neutral axis of the leaf spring; and
the second elastic connecting body section is inclined at a second angle with respect to a neutral axis of the leaf spring, the second angle being different than the first angle.

3. The motor vehicle arrangement of claim 1, wherein the pivot point is spatially arranged on a side of the neutral axis facing the elastic connecting body.

4. The motor vehicle arrangement of claim 1, wherein a torsion spring constant of the elastic connecting body about an axis running through the pivot point and in a transverse direction with respect to the leaf spring is 5 Nm/°.

5. The motor vehicle arrangement of claim 1, wherein the inclined sections of the elastic connecting body are formed by the limbs of a body having a Y-shaped cross-section.

6. The motor vehicle arrangement of claim 1, wherein the inclined sections of the elastic connecting body are formed by separate bodies with axes which are inclined with respect to one another.

7. The motor vehicle arrangement of claim 6, wherein the bodies are arranged on sections of a plate-shaped carrier which are inclined with respect to the leaf spring.

8. The motor vehicle arrangement of claim 1, wherein:
the elastic connecting body is bonded to the leaf spring or vulcanized thereon; and/or
the device for a rigid connection to the vehicle frame is formed by a surface which is configured for bonding to the frame of the motor vehicle or vulcanizing onto the frame of the motor vehicle.

9. The motor vehicle arrangement of claim 1, wherein:
the elastic connecting body is mechanically connected to the leaf spring; and/or
the device for the rigid connection to the frame of the motor vehicle is formed by a plate configured for rigid connection to the inclined sections and mechanical connection to the frame of the motor vehicle.

10. The motor vehicle arrangement of claim 1, comprising at least one elastic positional securing means which is arranged opposite the at least one elastic connecting body with respect to the neutral axis of the leaf spring.

11. A motor vehicle arrangement comprising:
a leaf spring configured to provide suspension of the motor vehicle;
a first elastic connecting body which is connected to a first surface of the leaf spring, the first elastic connecting body comprising a first device configured to provide a rigid connection to a frame of the motor vehicle, a first elastic connecting body section and a second elastic connecting body section which are inclined with respect to one another and at least partially spaced apart from one another; and
a second elastic connecting body which is connected to a second surface of the leaf spring which is opposite to the first surface, the second elastic connecting body comprising a second device configured to provide a rigid connection to a frame of the motor vehicle, a third elastic connecting body section and a fourth elastic connecting body section which are inclined with respect to one another and at least partially spaced apart from one another,
wherein the first elastic connecting body and the second elastic connecting body are spatially arranged opposite to each other with respect to a neutral axis of the leaf spring.

12. A motor vehicle comprising:
a frame;
an arrangement configured for connection to the motor vehicle, the arrangement comprising:

a leaf spring configured to provide suspension of the motor vehicle; and an elastic connecting body which is connected to a surface of the leaf spring at a first surface thereof and to the frame at a second end thereof, the elastic connecting body comprising a device configured to provide a rigid connection to the frame, a first elastic connecting body section and a second elastic connecting body section which are inclined with respect to one another and at least partially spaced apart from one another, wherein the leaf spring is arranged transversely with respect to the longitudinal axis of the vehicle and is provided for the suspension of, in each case, at least one wheel at, in each case, one end of the leaf spring.

13. The motor vehicle of claim 12, wherein a spring constant of the elastic connecting body is 200 N/mm in a longitudinal direction of the motor vehicle.

14. The motor vehicle of claim 12, wherein a spring constant of the elastic connecting body is 3000 N/mm in a transverse direction of the motor vehicle.

15. The motor vehicle of claim 12, wherein a spring constant of the elastic connecting body is 1000 N/mm in a vertical direction of the motor vehicle.

16. A motor vehicle comprising:
a frame;
a leaf spring configured to provide suspension of the motor vehicle;
a connecting body extending between and which directly connects the leaf spring to the frame, the connecting body having a first connecting body section and a second connecting body section which are inclined with respect to each other and spaced apart from one another.

17. The motor vehicle of claim 16, wherein the first and second connecting bodies have with axes which are inclined with respect to one another.

18. The motor vehicle of claim 16, wherein the connecting body further comprises a carrier directly attached to the leaf spring and a plate directly attached to the frame, the first and second connecting bodies being attached at one end to the carrier and at an opposite end to the plate.

19. The motor vehicle of claim 16, wherein the connecting body further comprises a carrier connected to the leaf spring, the first and second connecting bodies being attached at one end to the carrier and at an opposite end to the frame.

* * * * *